(12) United States Patent
Sudhakar (10) Patent No.: US 7,890,757 B2
(45) Date of Patent: Feb. 15, 2011

(54) RECEIVER NON-REPUDIATION

(75) Inventor: Gosukonda Naga Venkata Satva Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 1104 days.

(21) Appl. No.: 11/430,539

(22) Filed: May 9, 2006

(65) Prior Publication Data

US 2007/0157031 A1 Jul. 5, 2007

(30) Foreign Application Priority Data

Dec. 30, 2005 (IN) .......................... 3542/DEL/2005

(51) Int. Cl.
*H04L 9/08* (2006.01)
*H04L 9/32* (2006.01)

(52) U.S. Cl. ........................ 713/170; 713/153; 713/171; 713/176

(58) Field of Classification Search .................. 713/170
See application file for complete search history.

(56) References Cited

U.S. PATENT DOCUMENTS

| 5,710,816 | A | 1/1998 | Stork et al. |
| 5,790,669 | A | 8/1998 | Miller et al. |
| 6,044,463 | A | 3/2000 | Kanda et al. |
| 6,158,003 | A | 12/2000 | Kara |
| 6,336,105 | B1 | 1/2002 | Conklin et al. |
| 6,510,513 | B1 | 1/2003 | Danieli |
| 6,532,543 | B1 | 3/2003 | Smith et al. |
| 6,904,521 | B1 | 6/2005 | Jivsov |
| 6,963,974 | B1 | 11/2005 | Skinner et al. |
| 7,010,689 | B1 * | 3/2006 | Matyas et al. ................ 713/168 |
| 7,298,851 | B1 * | 11/2007 | Hendricks et al. ........... 380/282 |
| 7,434,048 | B1 * | 10/2008 | Shapiro et al. .............. 713/165 |
| 2001/0025311 | A1 * | 9/2001 | Arai et al. .................... 709/225 |
| 2002/0004902 | A1 * | 1/2002 | Toh et al. ..................... 713/170 |
| 2002/0143710 | A1 * | 10/2002 | Liu ............................. 705/75 |
| 2002/0194470 | A1 * | 12/2002 | Grupe ......................... 713/153 |
| 2003/0084003 | A1 * | 5/2003 | Pinkas et al. .................. 705/71 |
| 2003/0126464 | A1 * | 7/2003 | McDaniel et al. ........... 713/201 |
| 2005/0039031 | A1 * | 2/2005 | Mont et al. .................. 713/189 |
| 2005/0076210 | A1 * | 4/2005 | Thomas et al. .............. 713/165 |
| 2005/0251691 | A1 * | 11/2005 | Haufe ......................... 713/189 |

(Continued)

FOREIGN PATENT DOCUMENTS

WO WO-0125883 4/2001

OTHER PUBLICATIONS

Bo Meng; Shaomei Wang; Qianxing Xiong, "A fair non-repudiation protocol," Computer Supported Cooperative Work in Design, 2002. The 7th International Conference on, vol., No., pp. 68-73, 2002.*

(Continued)

*Primary Examiner*—Matthew T Henning
(74) *Attorney, Agent, or Firm*—Schwegman, Lundberg & Woessner, P.A.

(57) ABSTRACT

Techniques for assuring a receiver's non repudiation of a communication are provided. A sender encrypts data pursuant to a key. The encrypted data is sent to a receiver. A key to decrypt the data is sent separately to the receiver. The sender ensures the proper verifying information is acquired from the receiver for both the encrypted data and for the key.

5 Claims, 3 Drawing Sheets

U.S. PATENT DOCUMENTS

2006/0242068 A1* 10/2006 Jogand-Coulomb et al. ... 705/50

OTHER PUBLICATIONS

Boudaoud, K., "Nrpp: A new solution to prove the receipt of an electronic document", *Proc. of the 10th HP Openview University Association Plenary Workshop—HPOVUA'2003*, Geneva, Switzerland, (Jul. 6-9, 2003),1-3.

Tak, Sung W., et al., "A Software Framework for Non-Repudiation Service based on Adaptive~Secure Methodology in Electronic Commerce", *Information Systems Frontiers*, 6(1), (2004),47-66.

Boudaoud, K., et al., "NRPP : A new solution to prove the receipt of an electronic document", *10th HP Openview University Association Plenary Workshop (HPOVUA)*, Geneva, Switzerland, http://www.hpovua.org/PUBLICATIONS/PROCEEDINGS/10_HPOVUAWS/papers/pdf/HPOVUA03-B8.pdf, (Jul. 2003), 1-3.

Tak, S., et al., "A Software Framework for Non-repudiation Service in Electronic Commerce based on the Internet", *Eleventh International Conference on Computer Communications and Networks, 2002, Proceedings.*, http://www.sice.umkc.edu/~leeyu/Publications/cpaper9.pdf, (2002), 182-189.

\* cited by examiner

RECEIVER NON-REPUDIATION

RELATED APPLICATION

The present application claims priority to India Patent Application No. 3542/DEL/2005 filed in the India Patent Office on Dec. 30, 2005 and entitled "Receiver Non-Repudiation," the disclosure of which is incorporated by reference herein.

FIELD

The invention relates generally to network security and more particularly to techniques for assuring receiver non-repudiation of electronic communications over a network.

BACKGROUND

Individuals and enterprises are relying more and more on electronic communications to conduct their affairs and their business. Evidence of this can be seen with the large increase in electronic commerce. In fact, more and more consumers are now engaged in on-line banking or stock trading.

Electronic communication that involves financial matters is typically dealt with in different manners than a general electronic mail communication between friends. That is, a variety of encryption and/or secure communication protocols or channels may be implemented for a financial transaction, which would not typically be implemented for personal emails.

Generally, in a financial transaction both the sender and the receiver of that transaction are performing pursuant to some predefined agreement. So, a bank may guarantee a transaction if it successfully completes it for a customer, assuming the customer conformed to certain guidelines or rules during that transaction. In another example, a securities trader may be assured a buy or sell order is placed if confirmation is received and the trader complied with rules or regulations of the broker.

Some financial transactions may engage in more complex communications for the purposes of assuring security and privacy of the parties involved. For example, dynamic keys associated with custom encryption may be exchanged during the transaction between the parties involved in that transaction.

One problem that may result with more complex secure communications is that one of the parties during certain points of the transaction may not receive the information necessary to complete the transaction. For example, an encrypted transaction having a necessary decryption key may have a key that fails in some manner such that the transaction cannot be completed, since the receiver only has the decrypted transaction and does not have a valid key necessary to decrypt the details of that transaction.

When such a situation occurs, the receiver may repudiate or cancel the transaction because the receiver was unable to complete it, since the receiver never acquired the necessary key to decrypt the details of the transaction. This can be problematic in a highly dynamic and automated financial environment where senders are relying on the transaction to complete successfully.

Therefore, improved techniques for assuring a receiver receives proper information for an electronic communication are desirable.

SUMMARY

In various embodiments, techniques are provided for assuring a receiver does not repudiate an electronic communication. More particularly and in an embodiment, data is encrypted and designated for a receiver. A global identifier for decrypted version of the encrypted data is generated and the encrypted data and the global identifier are sent to the receiver. Next, a key to decrypt the encrypted data is transmitted to the receiver, if the encrypted data and the global identifier were received by the receiver. Finally, a determination is made as to whether the received acquired the key.

DETAILED DESCRIPTION

A "communication" is a transaction or session engaged in over a network by a sender and a receiver. The communication may entail one or more interactions between the sender and receiver during that session.

A "sender" and a "receiver" are resources engaged in a communication with one another over the network. The designation as to what is a sender and what is a receiver may change depending upon the role a party is playing in a communication. So, for one communication a party may be designated a sender and for another communication the same party may be designated a receiver.

A "resource" is includes an end-user, a service, an application, a system, or a device. A resource may be viewed as a logical or a physical entity represented within a machine-accessible medium. Accordingly, a resource includes a service and may also include a device or machine (e.g., printer, computer, intelligent apparel, intelligent appliance, phone, laptop, personal digital assistant (PDA) tablet personal computer (PC), network switch, hub, bridge, router, etc.). A resource may also include a user of a device or machine, a directory, or a data store (e.g., database, electronic file, data warehouse, etc.).

A "key" is electronic data that is used to encrypt and decrypt data. In some cases, the key is generated as a random number. The key may also be temporary and used only for a particular communication. A "session key" is a special type of key that is non-permanent or that is temporary. That is, a session key expires upon an event or condition, such as the expiration of a certain period of elapsed time from when the session key was initially generated and/or a detected event indicating a resource has signed out of a service, and the like.

A "signature" may be viewed as data that is used to verify other data or resources. In some cases, a signature may be a hash of a variety of different information. For example, a signature may include a hash of a message and an identity of a sending resource associated with the message. A signature may be temporary for a given portion of a communication or it may be persistent for a given resource.

Various embodiments of this invention can be implemented in existing resource or machine architectures as enhancements via network services. For example, in some embodiments, the techniques presented herein are implemented in whole or in part in proxy, directory, email, and/or IM products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit embodiments of the invention.

Figure 1:
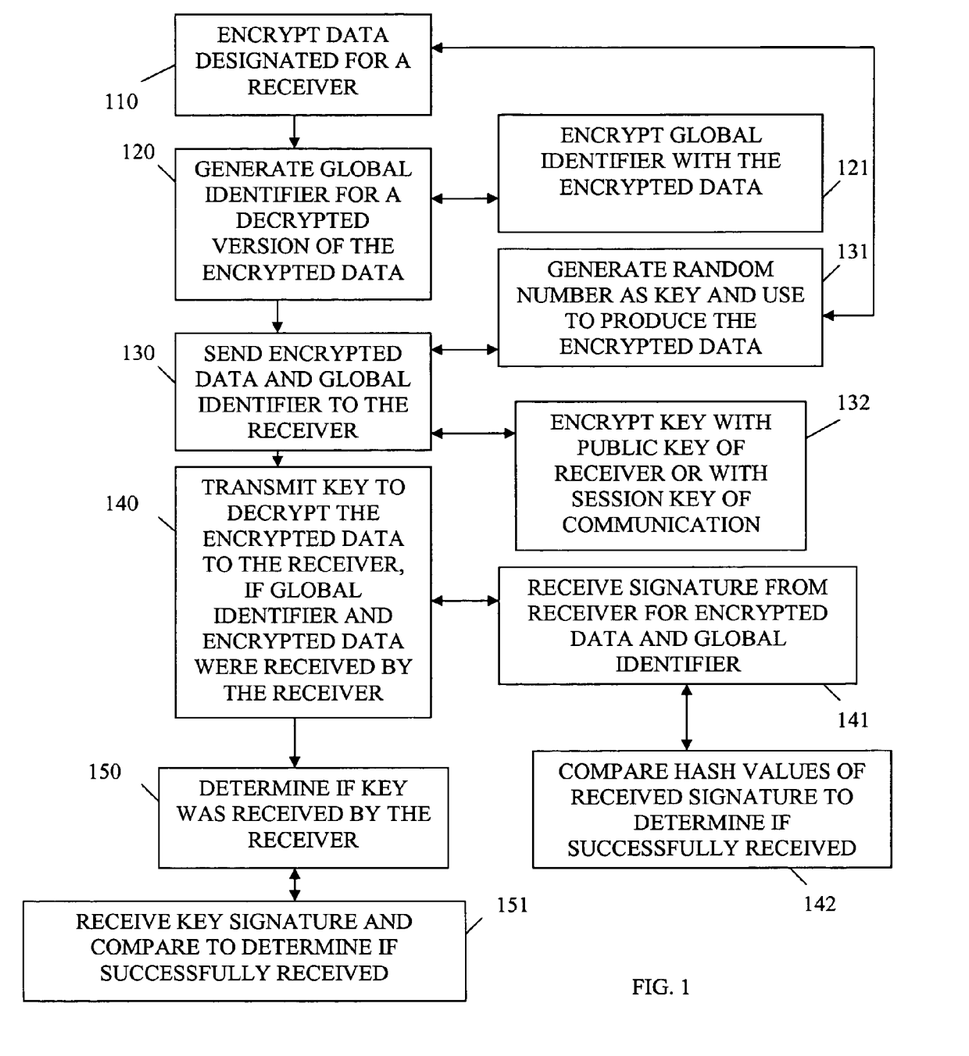
FIG. 1 is a diagram of a method for assuring a receiver does not repudiate a communication, according to an example embodiment.

FIG. 1 is a diagram of a method 100 for assuring a receiver does not repudiate a communication, according to an example embodiment. The method 100 (hereinafter "non-repudiation service") is implemented in a machine-access and machine-readable medium and is accessible over a network. The network may be wired, wireless, or a combination of wired and wireless.

In an embodiment, non-repudiation service is implemented at least partially within a service that processes within a sender's environment and at least partially within a receiver's environment. In another embodiment, the non-repudiation service is implemented as an external service to both the sender and the receiver that communicates with both the sender and receiver. According to one instance, the processing of the non-repudiation service may be implemented within an electronic mail (email) client, an instant messenger (IM) client, and/or a proxy (forward, transparent, and/or reverse).

The non-repudiation service is presented from the perspective of the processing associated with a sender of a communication. It is understood that the receiver of that communication may also include some processing to handle and participate in the communication with the sender. It is also understood that a like perspective taken from that which is associated with the receiver may also be achieved with the teachings presented herein and below.

Initially, the sender desires to engage in a secure communication, session, and/or transaction with a receiver. This communication may be for a variety of purposes, such as but not limited to, online trading of securities, a banking transaction, a purchase transaction, time-sensitive financial advice or opportunities, any transaction that may be considered time sensitive, etc. The communication may transpire over a secure communication channel, such as Secure Sockets Layer (SSL); although since a secure mechanism is presented herein that utilizes encryption it is apparent that in other embodiments the communication may also be achieved securely over an insecure communication channel, such as Hypertext Transfer Protocol (HTTP).

At 110, the non-repudiating service encrypts data associated with the communication. A decrypted version of that encrypted data is designated for the consumption of and subsequent delivery to a receiver.

At 120, the non-repudiating service generates a global identifier for a decrypted version of the data. The global identifier may be used for a variety of purposes, some of which will be discussed herein and below with respect to a trusted third party service that assist when the non-repudiating service is unable to very that a communication completed successfully with a receiver.

The global identifier may be unique to the specific communication and its data. Alternatively, the global identifier may be reused for subsequent communications between the non-repudiating service and a same receiver, assuming that the receiver successfully acknowledges the receipt of a decryption key, discussed below. As will also be discussed below, the global identifier acts as a conduit for the receiver to acquire the key from a trusted third party service if the receiver is unable to acquire the key successfully from the non-repudiating service.

According to an embodiment, at 121, the non-repudiating service may optionally also encrypt the global identifier with the encrypted data. That is, the global identifier may be unencrypted and subsequently sent to the receiver or it too may be encrypted with the data and subsequently sent as a package to the receiver.

At 130, the non-repudiating service sends the encrypted data and the global identifier over a network to the receiver. This transmission may occur within the context of an email message, within the context of an IM interaction, and/or within the context of direct communications between two automated services. In the latter scenario, the non-repudiating service acts on behalf of the sending automated service and the receiver or one of its services acts on behalf of the other automated service.

In an embodiment, at 131, the key, which is subsequently and separately transmitted to the receiver, may be generated as a random number or random string of characters that represent that key. This key may be used to initially encrypt the data associated with the communication and/or may also be used if to encrypt the global identifier, assuming the global identifier was encrypted as well.

In still another case, at 132, the encryption/decryption key may itself be encrypted. A variety of techniques may be used to encrypt the key, which may be symmetrical or asymmetrical. For instances, a public key associated with the receiver may be used in combination with a private key of the non-repudiating service to encrypt the key. Alternatively, a session key associated with the communication may be used to encrypt the key. Other techniques may also be used to encrypt the key, if an encryption of the key is desired.

At 140, the non-repudiating service transmits the key in a separate message for that of the encrypted data and the global identifier. The key is transmitted to the receiver.

It is also noted, at 140, that the key is transmitted if the receiver has previously acknowledged receipt of the encrypted data and the global identifier. Thus, the key is not transmitted if the receiver has not yet successfully acknowledged receipt of the encrypted data and the global identifier.

The non-repudiating service may verify that the receiver has acknowledged receipt of the encrypted data and the global identifier in a variety of manners. For example, at 141, the non-repudiating service may receive from the receiver a signature. The signature may represent a hashed value for the information or portions of information that the receiver acquired from the non-repudiating service. The hashed value may be for just the encrypted data, for just the global identifier, and/or for both the encrypted data and the global identifier. Prearrangements, pursuant to policy, may be agreed upon between the non-repudiating service and the receiver to establish what the signature represents and how it is to be derived. The non-repudiating service verifies the signature receipt of the encrypted data and the global identifier by reproducing a hash value and comparing it, at 142, to the hash value submitted as a signature receipt from the receiver. Assuming a match occurs, the non-repudiating service is reasonably certain that the receiver did in fact receive the encrypted data and the global identifier and the receiver cannot repudiate that it did not receive these items.

Again, the key is sent or transmitted to the receiver after the encrypted data and the global identifier were sent and after the non-repudiating service assures itself that the receive did in fact receive this items.

At 150, the non-repudiating service determines if the sent key was in fact received by the receiver, such that the receiver is now unable to repudiate its receipt. In a similar manner to the data acknowledgment process described at 141-142, the non-repudiating service may verify, at 151, that the key was received by the receiver, such that its receipt is not capable of being repudiated by the receiver.

That is, at 151, the receiver acknowledges receipt of the key via a different signature. This different signature may include a hash of the key, a hash of the key and the encrypted data, a hash of the key and a decrypted version of the encrypted data, etc. Policy will also dictate the signature contents for verifying receipt of the key. It is also noted that with the above provided examples of the signature or hash value for the key acknowledgment that the global identifier may be included as well. The non-repudiating service reproduces its own hash value and compares it to the signature of the key acknowledgment and assuming a match occurs the non-repudiating service is reasonable certain that the receiver did acquire the key and at this point the receiver cannot repudiate that it did not in fact receive the key.

There may be situations where the receiver acknowledges receipt of the encrypted data and the global identifier but appears to be repudiating receipt of the key. For example, the receiver may never acknowledge receipt of the key or may repeatedly attempt to unsuccessfully acknowledge receipt of the key. In such circumstances, the non-repudiating service may enlist the services of a trusted third party service to distribute the key to the receiver by using the global identifier.

The non-repudiating service may also enlist the services of the trusted third party service even if no problem exists. This may be done in situations where the non-repudiating service is being proactive and foresees that problems may arise with the receiver, such that the key and global identifier are sent to the trusted third party service before the non-repudiating service engages with the receiver in a communication.

The processing, associated with two scenarios presented above, is described below with respect to the method 200 of the FIG. 2.

Figure 2:
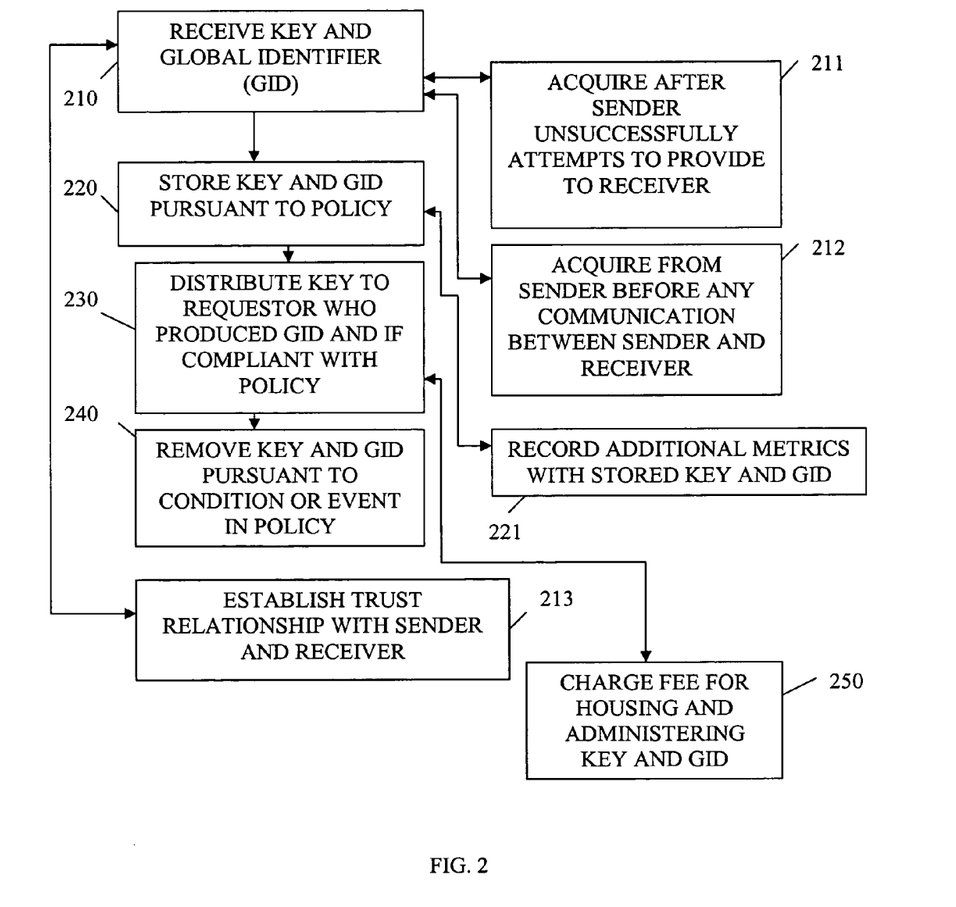
FIG. 2 is a diagram of method for assisting a receiver in completing a communication when problems are encountered with information from the sender, according to an example embodiment.

FIG. 2 is a diagram of method 200 for assisting a receiver in completing a communication when problems are encountered with information from the sender, according to an example embodiment. The method 200 (hereinafter "trusted third party service") is implemented in a machine-accessible and readable medium and is accessible over a network. The network may be wired, wireless, or a combination of wired and wireless.

In an embodiment, the trusted third party service represents exception processing to the non-repudiation service represented by the method 100 of the FIG. 1. That is, the trusted third party service is activated and used by both a sender and receiver when the receiver is encountering difficulties in receiving complete information to satisfy a communication sent from a sender. The trusted third party service facilitates completing that communication, such that the receiver is not able to repudiate the communication.

It should also be noted that the trusted third party service is not normally enlisted to assist with communications between a sender and a receiver. That is, the trusted third party service is called upon to facilitate the communications in situations where problems are encountered with the direct interactions between the sender and the receiver.

At 210, the trusted third party service receives a decryption key and a global identifier from a sender or from a non-repudiation service, such as the non-repudiation service represented by the method 100 and depicted in the FIG. 1. The key was used to encrypt data associated with a communication between a sender and a receiver and it may also be used by the receiver to decrypt the data associated with that communication. The global identifier permits the trusted third party service to identify the specific key associated with the encrypted data. The trusted third party service does not have to retain or acquire the encrypted data; although in some cases this may be done.

The trusted third party service may acquire the key and the global identifier at different points in time from the sender or the non-repudiation service of the sender. For example, at 211, the trusted third party service may acquire the key and the global identifier after the sender has been unsuccessful in its attempts to provide the key to the receiver during the communication occurring between the sender and the receiver.

In another case, at 212, the trusted third party service may acquire the key and the global identifier from the sender before the sender engages the receiver in the communication. That is, the sender may want insurance or may feel that timeliness in completing the communication is such that the trusted third party service should have the key before attempts to interact with the receiver are made. In this manner, if a failure occurs during the communication between the sender and the receiver, the key is immediately available for distribution to the receiver from the trusted third party service.

At 213, the trusted third party service, the sender, and the receiver may all have pre-established a trust relationship with one another. That is, the trusted third party service uses secure communications with the sender and with the receiver and may also require independent authentication of the sender and the receiver for each interaction that these resources have with the trusted third party service. This ensures the parties trust one another and can rely on communications being secure between the parties.

Generally, the key itself is not encrypted when provided to the trusted third party service. This can be used to prevent the receiver from asserting that it was unable to use the key supplied by the trusted third party service. However, in some embodiments, the trusted third party service may encrypt the key before it is delivered to the requestor with a public key of the requestor and a private key of the trusted third party service. So, the receiver should be capable of decrypting the key with its private key and with the public key of the trusted third party service. This may be used if added security is desired.

At 220, the trusted third party service stores the key and the global identifier pursuant policy. The policy may be agreed upon and established by the sender and the receiver and registered with the trusted third party service. The policy may dictate a variety of matters that are to be handled by the trusted third party service. For example, the policy may dictate how long any key and global identifier supplied to the trusted third party service should be retained. It may dictate whether other parties delegated by the receiver can acquire the key with the proper global identifier. It may also dictate what log information is recorded and perhaps reported to the sender and the receiver for auditing purposes.

According to an embodiment, at 221, the policy may dictate that the trusted third party service record a variety of configurable metrics. For example, the policy may instruct the trusted third party service to record the data and time that the sender deposited the key and global identifier. The metrics may also record the data and time any requestor, such as the receiver, made a request to acquire the key and whether such request was successful or unsuccessful indicating the proper global identifier was supplied or not supplied. In fact, any desired metrics may be configured within the policy and captured by the trusted third party service.

At 230, the trusted third party service distributes the key to a requestor who successfully produces the global identifier associated with that key to the trusted third party service. Again, such a transaction may be recorded and reported to the sender, such that the requestor or receiver may not repudiate that fact that it received the key.

In an embodiment, at 240, the trusted third party service may remove the key and the global identifier pursuant to any satisfied condition or event evaluated with the policy. So, as an example, the sender and receiver may agree that the trusted third party service should only retain the key for a few hours or a few days and after the expiration of that elapsed time from receipt of the key and the global identifier, these items are removed from the trusted third party service.

According to an embodiment, at 250, the trusted third party service may also charge a fee for providing its facilitation services to the sender and the receiver. The stated fee may be included in the policy or associated with other policies that are globally associated with the sender and/or receiver. The fee may be assessed exclusively to the sender, exclusively to the receiver, or apportioned to both the sender and the receiver.

In some cases, the trusted third party service and its services may be agreed upon by the sender and receiver in advance of any communication between the two resources. Moreover, and as was discussed above, the policy enforced by the trusted third party service and any fees assessed may be agreed upon between all the parties including the trusted third party service.

The trusted third party service facilitates communications between a sender and receiver and is called upon when problems are encountered. It may be used proactively before a communication or during a communication to correct the problem. Once the trusted third party service distributes a key to the receiver, the receiver is not in a position to further assert that it did not receive the key. The key is used to decrypt previously sent encrypted data, which was sent from the sender to the receiver during a communication between the sender and the receiver. Such an arrangement is particularly beneficial when the sender and the receiver engage in time or financially sensitive communications with one another. Again, in a normal transaction with no problems the services of the trusted third party service would not be necessary unless being used for insurance purposes, and in such cases the processing described with respect to the non-repudiation service represented by the method 100 of the FIG. 1 may be used.

Figure 3:
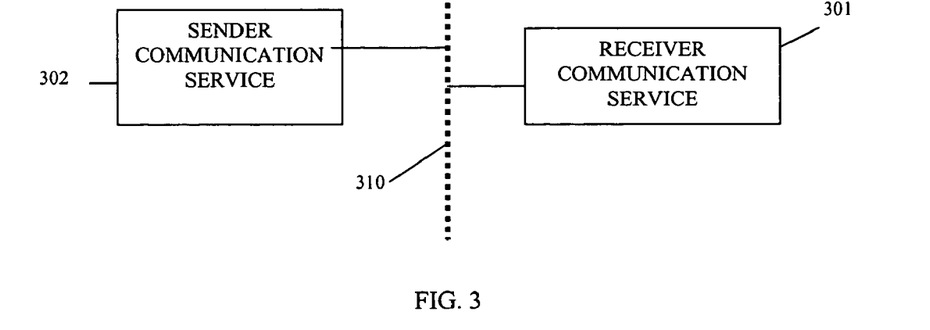
FIG. 3 is a diagram of a receiver non-repudiation system, according to an example embodiment.

FIG. 3 is a diagram of a receiver non-repudiation system 300, according to an example embodiment. The receiver non-repudiation system 300 is implemented in a machine-accessible and readable medium and is accessible over a network. The network may be wired, wireless, or a combination of wired and wireless. In an embodiment, the receiver non-repudiation system 300 implements, among other things, various aspects of the methods 100 and 200 of the FIGS. 1 and 2, respectively.

The receiver non-repudiation system 300 includes a receiver communication service 301 and a sender communication service 302. The components of the receiver non-repudiation system 300 engage in communications with one another over a network 310. These communications may be direct between the parties 301 and 302 or may be indirect, such as through an email system, or an IM system, and the like.

The receiver communication service 301 processes on behalf of a receiver within an environment of the receiver. The receiver is the recipient of a communication initiated from a sender via the sender communication service 302, which processes within an environment of the sender. The receiver communication service 301 is responsible for acknowledging various portions of the communication, such as when the receiver communication service 301 receives encrypted data and a global identifier associated with the communication and such as when the receiver communication service 301 receives a key or encrypted key that can be used to decrypt the encrypted data.

The receiver communication service 301 may acknowledge receipt of the encrypted data, the global identifier, and the key via a generated signature. In an embodiment, there is a distinct signature for the global identifier and the encrypted data and another distinct signature for the key.

Each signature may be generated pursuant to policy established between the receiver communication service 301 and the sender communication service 302. According to an embodiment, the signatures are hash values associated with at least one of the encrypted data, the global identifier, the key, any encrypted version of the key, any encrypted version of the global identifier, and/or a decrypted version of the encrypted data.

The sender communication service 302 initiates a communication with a receiver via its receiver communication service 301. Initially, the sender communication service 302 establishes an encryption/decryption key for data that is to be sent during that communication and a global identifier for the data. At this point the sender communication service 302 may elect to proactively deposit the key and the global identifier with a trusted third party service, such as the one depicted and discussed within the context of the method 200 of the FIG. 2. In other cases, the sender communication service 302 may not pre-deposit the key and the global identifier with the trusted third party service.

Next, the sender communication service 302 encrypts the data and optionally the global identifier and then sends the encrypted data and the global identifier to the receiver via the receiver communication service 301. In response, the receiver communication service 301 sends an acknowledging signature, as was discussed above. The sender communication service 302 verifies that the signature or verifying information received from the receiver communication service 301 is correct, and if so transmits the key to the receiver communication service 301 for purposes of permitting the receiver to decrypt the data associated with the communication for consumption.

The sender communication service 302 may elect to encrypt the key or to not encrypt the key. In cases where the key is encrypted it may be done with a session key associated with the communication or with public-private key pairs, such as a private key of the sender communication service 302 or sender and a public key of the receiver communication service 301 or the receiver. In fact, any symmetrical or asymmetrical encryption technique may be used if the key is encrypted before it is sent from the sender communication service 302 to the receiver communication service 301.

In response to successful receipt of the key, the receiver communication service 301 sends an acknowledging signature back to the sender communication service 302. Again, the sender communication service 302 validates the key acknowledgment and if successfully acknowledged then the receiver is no capable of subsequently repudiating the communication with the sender that occurred via the sender communication service 302.

In the event that the key was not acknowledged then the sender communication service 302 may enlist the services of the trusted third party service to receive a deposit for the key and the global identifier, if not already supplied in advance of the communication with the receiver communication service 301. The receiver communication service 301 may then, pursuant to policy, request the key from the trusted third party service by transmitting the global identifier to the trusted third party service. If the key is then distributed from the trusted third party service to the receiver communication service 301, then the receiver is not capable of repudiating the communication with the sender and records may be maintained to validate no repudiation is possible.

Figure 4:
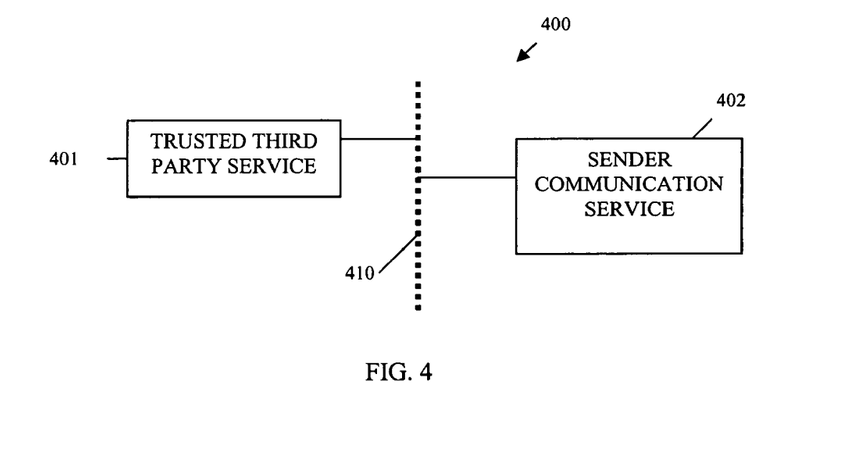
FIG. 4 is a diagram of another receiver non-repudiation system, according to an example embodiment.

FIG. 4 is a diagram of another receiver non-repudiation system 400, according to an example embodiment. The receiver non-repudiation system 400 is implemented in a machine-accessible and readable medium is accessible over a network. The network may be wired, wireless, or a combination of wired and wireless. In an embodiment, the receiver non-repudiation system 400 represents an alternative perspective to the receiver non-repudiation system 300 depicted in the FIG. 3.

The receiver non-repudiation system 400 includes a trusted third party service 401 and a sender communication service 402. The components of the receiver non-repudiation system 400 communicate with one another over a network.

The sender communication service 402 operates in the manners discussed above with respect to the non-repudiation service represented by the method 100 of the FIG. 1 and with respect to the sender communication service 302 of the receiver non-repudiation system 300 of the FIG. 3.

The trusted third party service 401 operates in the manners discussed above with respect to the trusted third party service represented by the method 200 of the FIG. 2.

The sender communication service 402 utilizes the trusted third party service 401 in two scenarios. First, as proactive insurance and in advance of any communication with a receiver, so as to assure that a decryption key and an associated global identifier are deposited with the trusted third party service 401 in the event that problems occur when the communication commences with the receiver. Second, the sender communication service 402 uses the trusted third party service 401 during a communication with a receiver that appears to have gone bad because the sender communication service is unable to acknowledge that the receiver has received the decryption key to decrypt data associated with the communication.

The trusted third party service 401 manages and distributes the key in response to receiving the global identifier associated with that key and pursuant to policy. The trusted third party service 401 may also record metrics according to policy, charge fees according to policy, issue reports according to policy, and/or issue notifications according to policy. The trusted third party service 401 houses, manages, and distributes the key.

If a receiver acquires the key from the trusted third party service 401, then the receiver is no longer in a position to repudiate a communication that occurred with the sender communication service 402.

One now appreciates how sensitive communications between senders and receivers may be tracked and commence in a manner that the receiver is not in a position to subsequently repudiate those communications. Under normal circumstances, the communications occur in a non-repudiated manner between just the sender and the receiver. In exceptions circumstances, a trusted third party service 401 may be used to facilitate the communications and maintain non-repudiation of the receiver for those communications.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a proxy, comprising:
    encrypting, by the proxy, data designated for a receiver;
    generating, by the proxy, a global identifier for a decrypted version of the encrypted data;
    sending, by the proxy, the encrypted data and the global identifier to the receiver;
    receiving, by the proxy, a signature from the receiver representing a hashed value for portions of information associated with the global identifier and the encrypted data, the hashed value is encrypted with a private key and a policy informs the receiver how to establish the signature from the portions of information, receipt of the signature indicating the receiver has the encrypted data and the global identifier;
    transmitting, by the proxy, a key to decrypt the encrypted data to the receiver; and
    determining, by the proxy, when the key is received by the receiver by comparing a different signature received back from the receiver with an independently generated value to determine whether the receiver successfully received the key to decrypt the encrypted data, the different signature supplied by the receiver including a hash of the key and a hash of the decrypted version of the encrypted data.

2. The method of claim 1 further comprising, generating, by the proxy, a random number as the key and using the key to produce the encrypted data.

3. The method of claim 1 further comprising, encrypting, by the proxy, the global identifier with the encrypted data.

4. The method of claim 1 further comprising, encrypting, by the proxy, the key before transmitting the key to the receiver, wherein the key is encrypted with at least one of a session key associated with a communication with the receiver and a public key of the receiver.

5. The method of claim 1 further comprising, independently producing a new hash value and comparing the new hash value to the received signature to verify that the receiver successfully received the encrypted data and the global identifier.

* * * * *

UNITED STATES PATENT AND TRADEMARK OFFICE
CERTIFICATE OF CORRECTION

PATENT NO. : 7,890,757 B2
APPLICATION NO. : 11/430539
DATED : February 15, 2011
INVENTOR(S) : Gosukonda Naga Venkata S. Sudhakar Page 1 of 1

It is certified that error appears in the above-identified patent and that said Letters Patent is hereby corrected as shown below:

On the face page, in field (75), in "Inventor", in column 1, line 1, delete "Satva" and insert -- Satya --, therefor.

Signed and Sealed this
Fifth Day of April, 2011

David J. Kappos
*Director of the United States Patent and Trademark Office*